(12) United States Patent
Lakshmanan et al.

(10) Patent No.: US 11,068,796 B2
(45) Date of Patent: Jul. 20, 2021

(54) PRUNING PROCESS EXECUTION LOGS

(71) Applicant: INTERNATIONAL BUSINESS MACHINES CORPORATION, Armonk, NY (US)

(72) Inventors: Geetika T. Lakshmanan, Winchester, MA (US); Szabolcs Rozsnyai, New York, NY (US); Fei Wang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1444 days.

(21) Appl. No.: 14/070,031

(22) Filed: Nov. 1, 2013

(65) Prior Publication Data

US 2015/0127588 A1 May 7, 2015

(51) Int. Cl.
*G06N 5/04* (2006.01)
*G06N 20/00* (2019.01)

(52) U.S. Cl.
CPC ............. *G06N 5/048* (2013.01); *G06N 20/00* (2019.01)

(58) Field of Classification Search
None
See application file for complete search history.

(56) References Cited

U.S. PATENT DOCUMENTS

| 5,723,283 | A  | * | 3/1998  | Classen ............. A61K 39/0018 435/4 |
| 6,420,139 | B1 | * | 7/2002  | Classen ............. A61K 39/0018 435/69.3 |
| 6,638,739 | B2 | * | 10/2003 | Classen ............. A61K 39/0018 435/69.3 |
| 7,895,323 | B2 |   | 2/2011  | Gupta et al. |
| 7,933,762 | B2 | * | 4/2011  | Pinto ...................... G05B 17/02 703/22 |
| 7,971,191 | B2 | * | 6/2011  | Guadalupe Castellanos ............... G06F 11/3636 717/128 |
| 7,979,844 | B2 |   | 7/2011  | Srinivasan |
| 8,082,220 | B2 |   | 12/2011 | Hadad et al. |
| 8,321,251 | B2 |   | 11/2012 | Opalach et al. |
| 8,396,884 | B2 |   | 3/2013  | Singh et al. |
| 8,402,444 | B2 |   | 3/2013  | Ball et al. |

(Continued)

FOREIGN PATENT DOCUMENTS

| WO | WO 2013192593 A2 | * | 12/2013 | ......... G06F 19/3437 |
| WO | WO 2014043623 A1 | * | 3/2014  | ............ G06F 11/008 |

OTHER PUBLICATIONS

Maggi, et al., "Predictive Monitoring of Business Processes," arXiv: 1312.4874, Thu, Dec. 19, 2013 19:34:45 GMT, 16 pp., 2013.*

(Continued)

*Primary Examiner* — Ann J Lo
*Assistant Examiner* — Fen Christopher Tamulonis
(74) *Attorney, Agent, or Firm* — Tutunjian & Bitetto, P.C.; Anthony Curro

(57) ABSTRACT

Methods and systems for pruning process execution logs include learning a predictive model from a set of execution traces that characterize a process, where the predictive model determines a likelihood of a given instance reaching a specified outcome; identifying attributes in the predictive model that fall below a threshold measure of relevance to the specified outcome using a processor; and removing the identified attributes from the set of execution traces.

10 Claims, 3 Drawing Sheets

(56) References Cited

U.S. PATENT DOCUMENTS

| | | | | |
|---|---|---|---|---|
| 8,417,715 | B1* | 4/2013 | Bruckhaus | G06Q 10/04 707/758 |
| 8,589,331 | B2* | 11/2013 | Duan | G06N 5/048 706/52 |
| 8,751,273 | B2* | 6/2014 | Pinto | G06F 17/50 705/7.11 |
| 8,996,436 | B1* | 3/2015 | Ren | G06N 5/02 706/46 |
| 9,171,259 | B1* | 10/2015 | Laxmanan | G06N 5/022 |
| 9,280,740 | B1* | 3/2016 | Laxmanan | G06N 5/022 |
| 9,299,035 | B2* | 3/2016 | Lakshmanan | G06N 20/00 |
| 9,355,371 | B2* | 5/2016 | Goodwin | G06N 5/022 |
| 2001/0051934 | A1* | 12/2001 | Oyanagi | G06F 16/9027 706/12 |
| 2003/0061015 | A1* | 3/2003 | Ben-Gal | G06K 9/6282 703/2 |
| 2003/0212519 | A1* | 11/2003 | Campos | G06K 9/6223 702/101 |
| 2003/0236691 | A1* | 12/2003 | Casatl | G06Q 10/06312 705/7.27 |
| 2004/0133531 | A1* | 7/2004 | Chen | G06K 9/6298 706/8 |
| 2005/0138483 | A1 | 6/2005 | Hatonen et al. | |
| 2005/0177414 | A1* | 8/2005 | Priogin | G06Q 10/06 706/21 |
| 2005/0234688 | A1* | 10/2005 | Pinto | G05B 17/02 703/6 |
| 2005/0278705 | A1* | 12/2005 | Castellanos | G06F 11/3636 717/128 |
| 2006/0173663 | A1* | 8/2006 | Langheier | G06F 19/00 703/11 |
| 2006/0293940 | A1 | 12/2006 | Tsyganskiy et al. | |
| 2007/0011135 | A1* | 1/2007 | Chitgupakar | G06F 16/20 |
| 2008/0172214 | A1* | 7/2008 | Col | G06Q 50/24 703/11 |
| 2009/0193039 | A1* | 7/2009 | Bradley | G06F 16/2465 |
| 2010/0076799 | A1* | 3/2010 | Magent | G06Q 30/0202 705/7.31 |
| 2010/0267102 | A1 | 10/2010 | Begin et al. | |
| 2010/0281469 | A1* | 11/2010 | Wang | G06F 8/45 717/128 |
| 2011/0167412 | A1 | 7/2011 | Kahlon et al. | |
| 2012/0049881 | A1* | 3/2012 | Johnson | G01R 31/2894 324/762.01 |
| 2012/0066166 | A1* | 3/2012 | Curbera | G06N 7/005 706/52 |
| 2012/0101974 | A1 | 4/2012 | Duan et al. | |
| 2012/0323827 | A1* | 12/2012 | Lakshmanan | G06F 17/18 706/12 |
| 2013/0103441 | A1* | 4/2013 | Doganata | G06Q 10/06 705/7.12 |
| 2013/0103719 | A1 | 4/2013 | Gotz et al. | |
| 2013/0339088 | A1* | 12/2013 | Olsen | G06Q 30/0202 705/7.31 |
| 2014/0067732 | A1* | 3/2014 | Doganata | G06Q 10/06375 706/12 |
| 2014/0074764 | A1* | 3/2014 | Duftler | G06N 5/025 706/47 |
| 2014/0279769 | A1* | 9/2014 | Goodwin | G06N 5/022 706/14 |
| 2014/0365403 | A1* | 12/2014 | Demuth | G06N 20/00 706/11 |
| 2014/0365533 | A1* | 12/2014 | Debray | G06F 16/21 707/803 |
| 2015/0112710 | A1* | 4/2015 | Haber | G16H 50/30 705/2 |
| 2015/0127588 | A1* | 5/2015 | Lakshmanan | G06N 20/00 706/12 |
| 2015/0127589 | A1* | 5/2015 | Lakshmanan | G06N 20/00 706/12 |
| 2015/0227838 | A1* | 8/2015 | Wang | G06F 11/008 706/12 |

OTHER PUBLICATIONS

Wang et al., "Trace-Based symbolic analysis for atomicity violations," Proceedings of the 16th international conference on Tools and Algorithms for the Construction and Analysis of Systems (TACAS'10), pp. 328-342, 2010.*

Wang et al., "Symbolic pruning of concurrent program executions," in: Foundations of Software Engineering, pp. 23-32. ACM, New York (2009).*

Wang et al., "Symbolic predictive analysis for concurrent programs," in: International Symposium on Formal Methods, pp. 256-272. ACM, New York (2009).*

Maggi et al., "Predictive Monitoring of Business Processes," arXiv:1312.4874v2 [cs.SE], Thu, Dec. 19, 2013 19:34:45 GMT.*

Arentze, T.A. et al. "Using Decision Tree Induction Systems for Modeling Space-Time Behavior" Geographical Analysis vol. 32 No. 4 [Published 2000] [Retrieved online Jan. 2020] <URL: https://onlinelibrary.wiley.com/doi/epdf/10.1111/j.1538-4632.2000.tb00431.x> (Year: 2000).*

Unnamed, "Artificial Intelligence: Representation and Problem Solving, Induction to Learning & Decision Trees." CMU, 2007 [Published 2007] [Retrieved May 2020] <URL: https://www.cs.cmu.edu/afs/cs/academic/class/15381-s07/www/slides/041007decisionTrees1.pdf> (Year: 2007).*

Russell et al. "Artificial Intelligence: A Modern Approach" Prentice Hall, 2nd ed. [Published 2003] [Retrieved May 2020] (Year: 2003).*

Brodley, Carla E. "Automatic Selection of Split Criterion during Tree Growing based on Node Location." MLP '95 [Published 1995] [Retrieved Oct. 2020] <URL: https://www.sciencedirect.com/science/article/pii/B9781558603776500189> (Year: 1995).*

Brodley, Carla E. "Multivariate Decision Trees" Machine Learning 19, p. 45-77 [Published 1995] [Retrieved Oct. 2020] <URL: https://link.springer.com/article/10.1023/A:1022607123649> (Year: 1995).*

Not Listed "IBM SPSS Statistics 20 Documentation" IBM Support [Published 2011] [Retrieved Dec. 2020] <URL: https://www.ibm.com/support/pages/node/724851#en> (Year: 2011).*

Alves De Medeiros, A., et al. "Process Mining Based on Clustering: A Quest for Precision" Business Process Management Workshops. Sep. 2007. (12 Pages).

Cornelissen, B., et al. "Execution Trace Analysis Through Massive Sequence and Circular Bundle Views" Deft University of Technology—Software Engineering Research Group: Technical Report Series. Feb. 2008. pp. 1-40.

Gunther, C., et al. "Fuzzy Mining—Adaptive Process Simplification Based on Multi-Perspective Metrics" Business Process Management 2007. Sep. 2007. pp. 328-343.

Kahlon, V., et al. "Universal Causality Graphs: A Precise Happens-Before Model for Detecting Bugs in Concurrent Programs" Computer Aided Verification, 22nd International Conference, CAV 2010. Jul. 2010. pp. 1-17.

Karegowda, A., et al. "Comparative Study of Attribute Selection Using Gain Ratio and Correlation Based Feature Selection" International Journal of Information Technology and Knowledge Management, vol. 2, No. 2. Jul. 2010. pp. 271-277.

Lakshmanan, G., et al. "Leveraging Process Mining Techniques to Analyze Semi-Structured Processes" IT Professional, vol. 15, Issue 5. Sep. 2013. pp. 1-13.

Lakshmanan, G., et al. "Predictive Analytics for Semi-Structured Case Oriented Business Processes" BPM 2010 Workshops. Sep. 2010. pp. 640-651.

Rosstad, T., et al. "Development of a Patient-Centred Care Pathway Across Healthcare Providers: A Qualitative Study" BMC Health Services Research 2013. Apr. 2013. pp. 1-9.

Song, M., et al. "Trace Clustering in Process Mining" Proceedings of the 4th Workshop on Business Process Intelligence (BPI'08), BPM Workshops 2008. Sep. 2008. pp. 1-12.

Taylor, J. "Simplifying Over-Complex Processes" Decision Management Solutions. Dec. 2010. (51 Pages) Available at: http://www.slideshare.net/jamet123/simplifying-over-complex-processes-with-decision-management.

Van Der Aalst, W., et al. "Process Mining" Communications of the ACM, vol. 55, No. 8. Aug. 2012. pp. 76-83.

(56) References Cited

OTHER PUBLICATIONS

Van Dongen, B., et al. "The Prom Framework: A New Era in Process Mining Tool Support" 6th International Conference, ICATPN 2005. Jun. 2005. pp. 444-454.

Yang, W., et al. "A Process-Mining Framework for the Detection of Healthcare Fraud and Abuse" Expert Systems with Applications, vol. 31, Issue 1. Jul. 2006. pp. 56-68.

Duftler, M., et al. "Extracting Clinical Care Pathways Correlated With Outcomes" U.S. Appl. No. 13/851,755, filed Mar. 27, 2013. (32 Pages).

Lakshmanan, G., et al. "Iterative Refinement of Pathways Correlated With Outcomes" U.S. Patent Application filed concurrently on Nov. 1, 2013. (26 Pages).

\* cited by examiner

PRUNING PROCESS EXECUTION LOGS

BACKGROUND

Technical Field

The present invention relates to building process models and, more particularly, to pruning irrelevant attributes from the execution traces from which the process models are built.

Description of the Related Art

An execution trace describes events occurring in an instance of some process. These events include tasks that are executed in the process, as well as data values input or output by the tasks. Process mining involves mining a graph of causal behavior from process execution logs and produces a process model as output. A process model may be represented by a causal graph of nodes and edges, where nodes are tasks in a process and edges represent the causality between the tasks. The model may also have gateways that show execution semantics along the edges and nodes of the graphs, such as parallelism or exclusive flows.

Process models can be mined from a set of execution traces. A mined process model could be very complex, with many nodes and edges and display spaghetti-like behavior where rarely-used or redundant paths clutter the graph. In one example, a process model could represent a pathway, such as a treatment pathway. One way to accomplish this is to find a set of execution traces that lead to a particular outcome and then mining a process model from these traces.

However, execution traces may include events that are not relevant or which have no impact on the outcome of the process. Currently users have to manually sift through execution logs and eliminate by hand tasks that are not relevant before mining the logs and building a process model. In any realistic process of any substantial size and complexity, this can be a very time consuming process.

SUMMARY

A method for pruning process execution logs includes learning a predictive model from a set of execution traces that characterize a process, wherein the predictive model determines a likelihood of a given instance reaching a specified outcome; identifying attributes in the predictive model that fall below a threshold measure of relevance to the specified outcome using a processor; and removing the identified attributes from the set of execution traces.

An execution log pruning system includes a predictive model module configured to learn a predictive model from a set of execution traces that characterize a process, wherein the predictive model determines a likelihood of a given instance reaching a specified outcome; a relevance module comprising a processor configured to identify attributes in the predictive model that fall below a threshold measure of relevance to the specified outcome; and a pruning module configured to remove the identified attributes from the set of execution traces.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide for the elimination of irrelevant activities (also known as events) in process execution traces that have no impact on the outcome of the process. The present embodiments also remove attributes which are redundant or which otherwise do not meaningfully contribute to the formation of a process model. Once these attributes are removed, process models mined from such execution traces have fewer tasks and provide more clarity in terms of showing the causality of events leading to a particular outcome.

Figure 1:
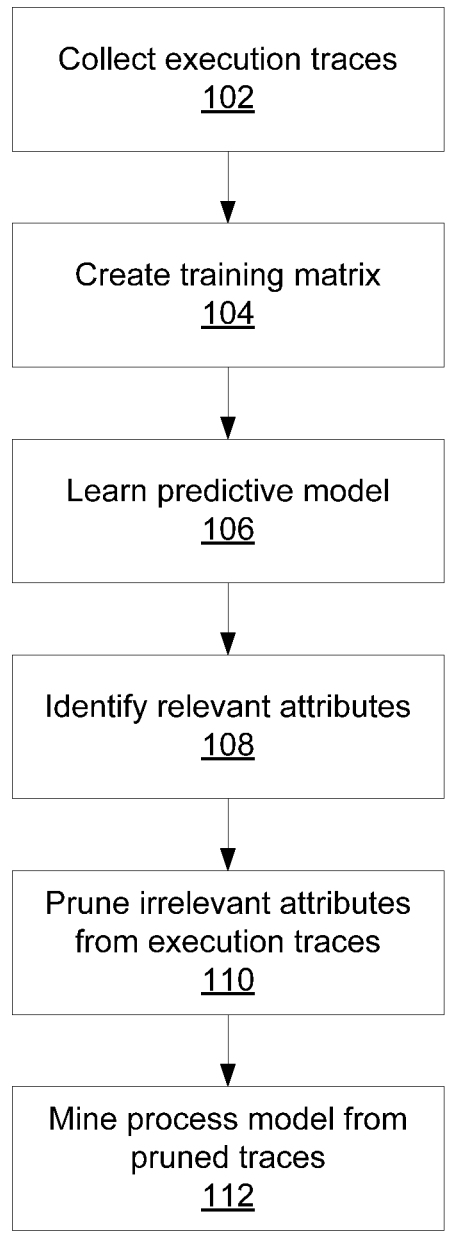
FIG. 1 is a block/flow diagram of a method for pruning an execution log in accordance with the present principles.

Referring now to the drawings in which like numerals represent the same or similar elements and initially to FIG. 1, a method for pruning execution traces and building a process model is shown. Block 102 collects as input a set of execution traces that characterize a process. These execution traces may be collected by reviewing records pertaining to the process, in particular those records that result in a specified outcome. For example, when attempting to determine what process paths might lead a patient to being hospitalized, exemplary execution traces might resemble the following:

Patient1 trace: Diuretics, Antianginal Agents, Crackles on Lung, PulseOxygen, Creatinine, Vital Patient1 outcome: Hospitalized Patient2 trace: Cardiotonics, Chest X-ray, Potassium, Diuretics, Heart Failure Patient2 outcome: Not hospitalized Patient3 trace: Crackles on Lung, Chest X-ray, Cardiotonics, Diuretics, Heart Failure, Potassium, Vital Patient3 outcome: Hospitalized Block 104 characterizes the execution traces having the desired outcome as a matrix. Each column of the matrix is an attribute and each row is a different execution trace. In one example, attributes that are present in an execution trace are represented by values of 1, while attributes that are not present in the trace are represented by values of 0. As an alternative to the binary-valued attribute matrix, the matrix may instead have a continuous value range or some set of discrete range options, where each matrix entry could represent the number of times the attribute corresponding to that matrix column occurs in the trace corresponding to the row of that matrix entry. Block 106 uses machine learning to determine which attributes are correlated with outcomes. This creates a predictive model that embodies attributes which are most strongly correlated with the outcome of interest.

Figure 4:
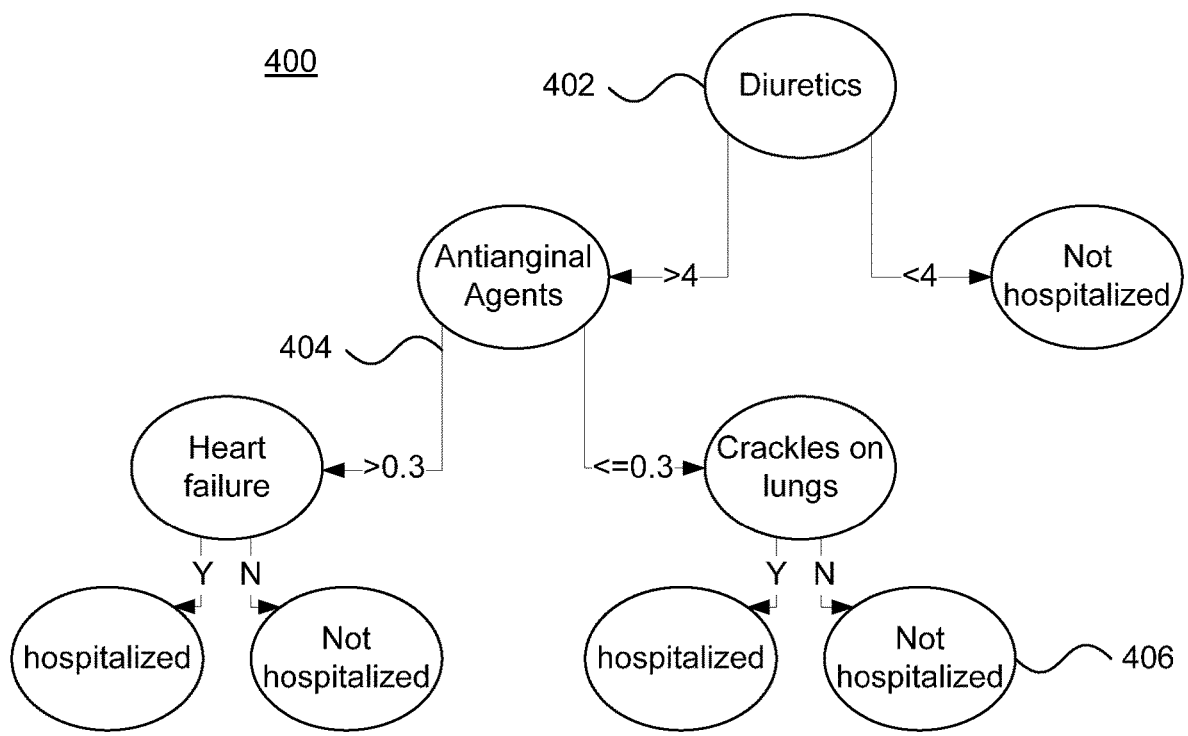
FIG. 4 is a diagram of a predictive model learned from an execution log in accordance with the present principles.

For example a decision tree creates a ranking of attributes that predict the specified outcome. The tree nodes split on the basis of attribute values that lead to a specific outcome. In FIG. 4, for example, the tree indicates that if the value of Diuretics is greater than 4, the value of Antianginal Agents is greater than 0.3, and Heartfailure is true, then the patient is hospitalized. In this example, the machine learning algorithm—in other words the decision tree algorithm—found the Diuretics, Antianginal Agents, and HeartFailure attributes to be correlated with the outcome (hospitalized or not). In particular the topmost attribute used for splitting in the tree, namely Diuretics, is the attribute that is most highly correlated with the Hospitalization outcome. There may also be attributes in the execution traces that do not become splitting criteria in the tree. This reflects the decision tree algorithm finding these attributes to have little or no correlation with the outcome. A machine learning algorithm determines correlation of an attribute with an outcome by looking at how often an attribute leads to a specific outcome and what value an attribute has for that outcome, then computing the statistical significance of this occurrence over a set of traces.

Block 108 identifies attributes that are irrelevant to the outcome using the predictive model. This may include identifying only those attributes which have no bearing on the outcome at all, or may be expanded to include attributes with only a small amount of predictive power. For example, if a predictive model has a branch with two possibilities, where one branch has a 51% chance of leading to hospitalization and the other has a 49% chance of leading to hospitalization, then the branch is not strongly predictive of the outcome. A user may set a threshold to determine how weakly predictive an attribute should be to classify the attribute as irrelevant.

Block 110 removes irrelevant attributes from the execution traces. This process may be performed automatically simply by editing the training matrix, setting to zero any entry that corresponds to an irrelevant attribute. Block 112 then mines the process model from the pruned traces to create a pruned process model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
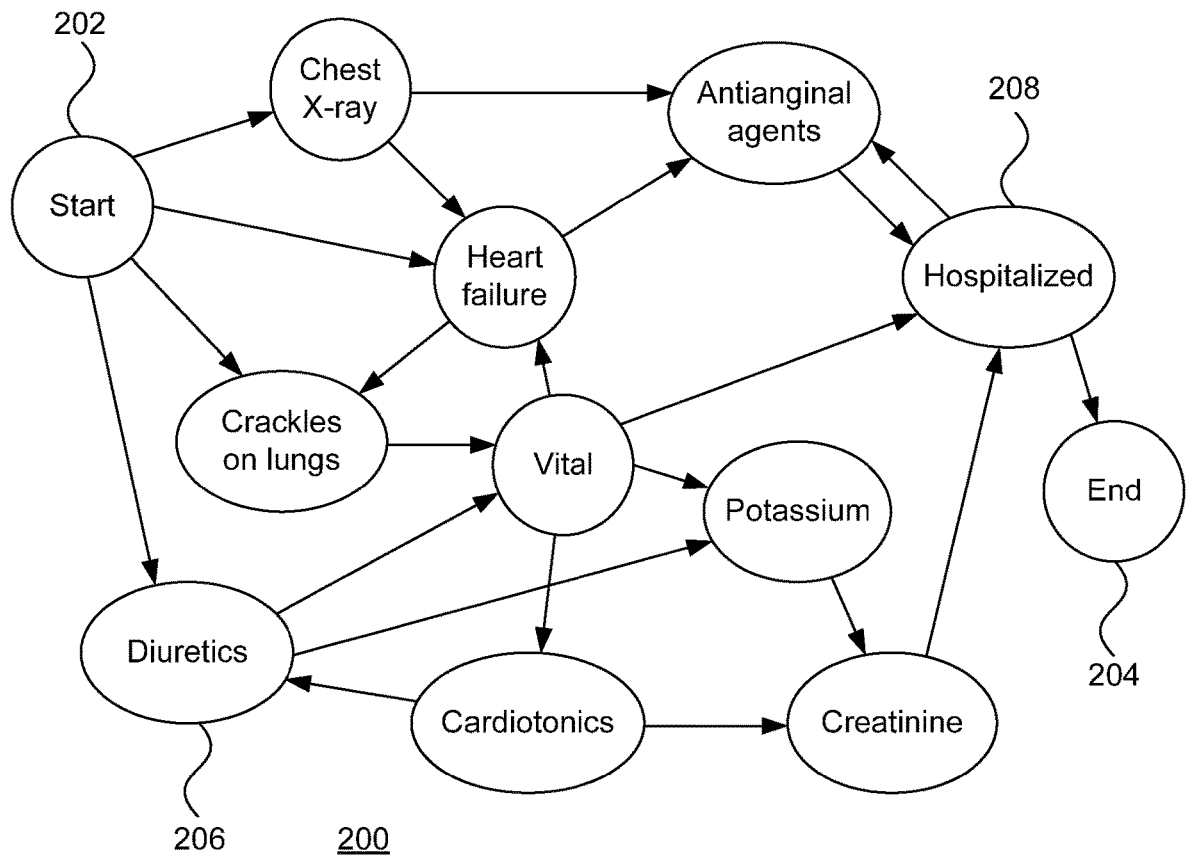
FIG. 2 is a diagram of a process model in accordance with the present principles.

Referring now to FIG. 2, an exemplary process model 200 is shown. In this example, a process model 200 is mined from traces of patients who are hospitalized. A goal of such an exercise could be to view the care pathways leading to hospitalization. The process model has a beginning node 202 and an ending node 204 with one or more nodes 206 in between. The process model 200 is characterized by its ending condition 208.

One can use feature selection to determine which attributes 206 are important in predicting hospitalization on this set of execution traces. Here the term attributes is used to indicate a task or data variable that is extracted from the raw data. For example, the task Diuretics is an attribute, and it may have a value associated with it such as 3 mg (indicating the dosage of Diuretics medication prescribed). A process instance or trace may also have instance level data attributes associated with it. For example, the "Diuretics" node may have an associated dosage.

In the present example, the process model 200 describes potential process flows for patients with heart problems. Each path through the graph represents a different potential execution trace, each ending with the condition of being hospitalized. For example, a patient may have a chest x-ray, may subsequently suffer heart failure, be given antianginal agents, and then may be hospitalized. In an alternative execution trace, the patient may be given diuretics, followed by potassium, followed by creatinine, and then be hospitalized.

An exemplary matrix to represent some execution traces that create the process model 200 is shown below at table 1.

TABLE 1

| Traces | Diuretics_Amount | Diuretics | Antianginal Agents | Heart Failure | Potassium |
|---|---|---|---|---|---|
| Trace 1 | 4 | 1 | 1 | 0 | 0 |
| Trace 2 | 6 | 1 | 0 | 1 | 1 |

As can be readily seen from FIG. 2, a process model can quickly grow dense and difficult to read. The many interconnections make it difficult to parse out meaningful execution traces. In a case such as this, the user may determine that the process model 200 is too dense and should be made more specific.

Figure 3:
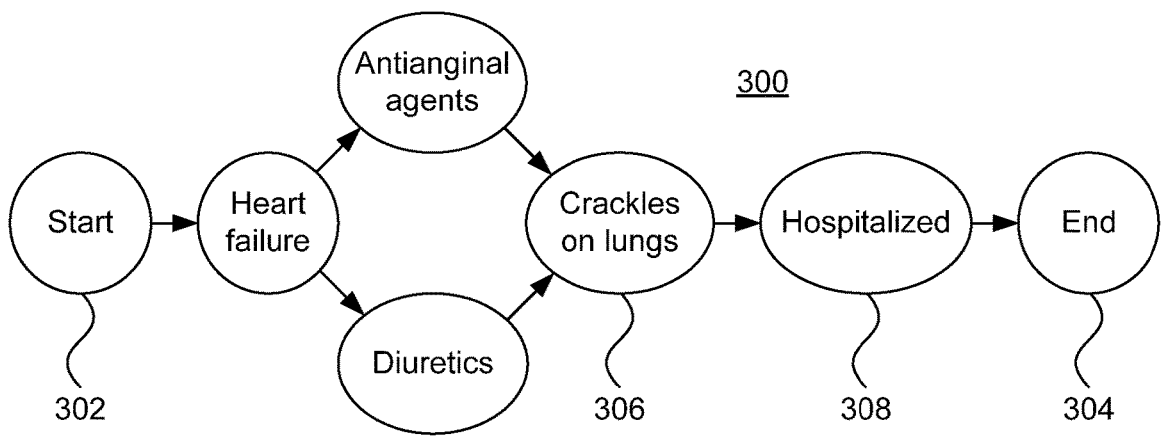
FIG. 3 is a diagram of a process model mined from a pruned execution log in accordance with the present principles.

Referring now to FIG. 3, a pruned process model 300 is shown. As with the process model 200 described above, the pruned model 300 has a beginning node 302 and an ending node 304 and is made up of attributes 306. The refined model 300 has the same target condition 308 as the original model, but the number of attributes 306 is much smaller.

Given the exemplary patient traces shown above, the complete set of tasks that would be extracted from the traces and which could show up in the mined process model 200 are Antianginal Agents, Crackles on Lung, Pulse Oxygen, Creatinine, Vital, Chest X-ray, Potassium, Diuretics, Heart Failure, and Cardiotonics. Of these, only the attributes of Antianginal Agents, Crackles on Lung, Diuretics, Heart Failure, and Cardiotonics are actually relevant to predicting whether the patient is hospitalized, leaving the attributes of Pulse Oxygen, Creatinine, Vital, Chest X-Ray, Potassium, and Cardiotonics as being irrelevant.

Referring now to FIG. 4, a predictive model 400 is shown that represents these attributes. The predictive model 400 can be learned from the training matrix described using the statistical techniques described above, where the frequency and values of attributes leading to specific outcomes influences whether an attribute is included in the predictive model 400 and where. A binary decision tree is used in this example, but it should be understood that other structures may be employed. A set of nodes 402 represent attributes of the process. For example, a first node 402 relates to the dosage of diuretics given to a patient. The dosage is represented by an edge 404, and each edge 404 in the model 400 represents some condition relating to whether a given patient will be hospitalized. The leaf nodes 406 represent outcomes, determining whether the patient in question is likely to be hospitalized.

The predictive model 400 includes a ranking of how attributes 402 impact the outcome, with the most significant attributes closer to the root of the tree. By selecting a subset of the attributes (e.g., the top k levels of the model 400), only the most relevant attributes are kept. Irrelevant attributes do not help determine whether a given execution will reach the outcome in question and hence they do not appear in the model 400. After creating the prediction model 400, the irrelevant attributes are eliminated from the execution traces. It is also important to note that the predictive model 400 may not include the entire set of attributes included in the execution traces. This is because attributes not in a predictive model may have no impact on the outcome specified to the predictive model during the training phase. Therefore, even if one were to select all of the attributes in the predictive model, the resulting predictive model could be a subset of the entire attribute set.

The attributes 402 that are removed from the predictive model 400 are used to prune the execution traces. For example, consider the removal of all attributes that are mere data objects (e.g., identifying the pharmacy a particular drug came from) or which are present in most execution traces (e.g., representing something with low predictive power). The removal of the associated task from the training set simplifies the resulting output model. After pruning, the execution traces described above include:

Patient1 trace: Diuretics, Antianginal Agents, Crackles on Lung

Patient2 trace: Diuretics, Heart Failure,

Patient3 trace: Crackles on Lung, Diuretics, HeartFailure

As a result of this pruning, the mined model 300 includes fewer nodes and fewer edges that represent irrelevant causal relationships.

Figure 5:
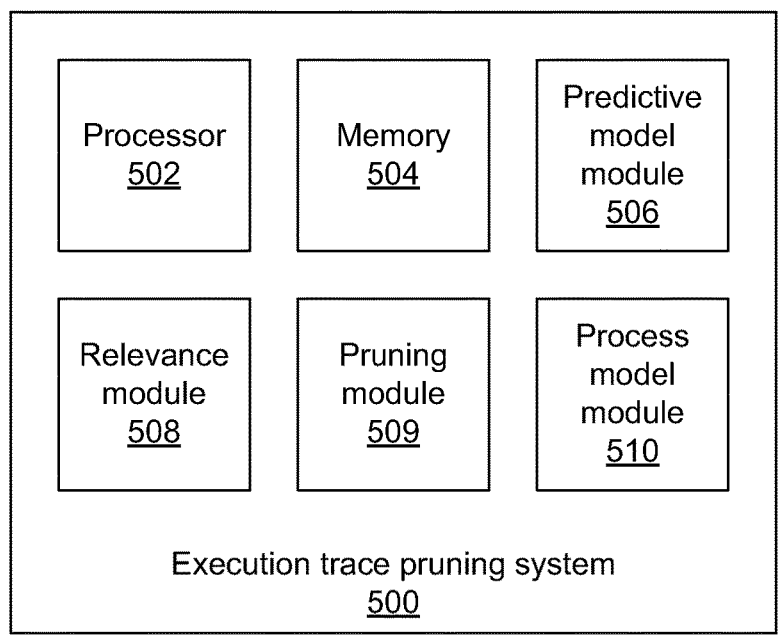
FIG. 5 is a block diagram of a system for pruning an execution log in accordance with the present principles.

Referring now to FIG. 5, a system 500 for pruning execution traces is shown. The system includes a processor 502 and a memory 504. The memory 504 stores a set of execution traces that describe some process. A predictive model module 506 forms a predictive model as described above from the execution traces stored in memory 504. A relevance module 508 uses processor 502 to determine how relevant each attribute of the execution traces is and informs predictive model module 506, such that the predictive model module 506 incorporates relevance information, for example by omitting attributes that fall below a threshold level of relevance or by ranking attributes in the output predictive model according to their relevance. A pruning module 509 uses the processor 502 to edit the execution traces in memory 504, removing any attributes deemed to have a relevance lower than a threshold relevance. A process model module 510 may then build a process model from the pruned execution traces stored in memory 504.

Having described preferred embodiments of a system and method for pruning process execution logs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for pruning process execution logs, comprising:

generating a training matrix from a set of execution traces that characterize a process, with rows of the training matrix representing individual execution traces and columns of the training matrix representing attributes of the execution traces;

learning a predictive model from the training matrix by forming a binary decision tree, wherein the predictive model determines a likelihood of a given instance reaching a specified outcome, such that attributes that are more relevant to predicting the specified outcome are placed closer to a root node of the binary decision tree than less relevant attributes, wherein relevance of an attribute is determined by a predictive power of the attribute with respect to the specified outcome;

identifying attributes in the predictive model that fall below a threshold measure of relevance to the specified outcome using a processor;

automatically removing the identified attributes from the set of execution traces by setting to zero any entry in the training matrix that corresponds to an attribute that falls below the threshold measure of relevance;

mining the pruned process model from the training matrix after removing the identified attributes;

characterizing care pathways leading to hospitalization based on the pruned process model for health care determinations; and predicting that a patient will be hospitalized based on the characterized care pathways, such that only care pathways of relevant attributes are used to determine whether to hospitalize the patient.

2. The method of claim 1, wherein the threshold measure of relevance is a rank in the binary decision tree, such that attributes that are farther away from the root node than the threshold rank are identified in said step of identifying.

3. The method of claim 1, wherein each execution trace comprises one or more attributes that represent individual tasks or data values in the execution trace.

4. The method of claim 1, wherein the training matrix is binary-valued, and wherein generating the training matrix includes setting a value of one for any attribute that is present in an execution trace and setting a value of zero for any attribute that is absent in the execution trace.

5. The method of claim 1, wherein the training matrix includes continuous-valued entries, and wherein generating the training matrix includes setting a continuous-valued matrix entry to be a count of how frequently a respective attribute occurs in an execution trace.

6. A non-transitory computer readable storage medium comprising a computer readable program for pruning execution logs, wherein the computer readable program when executed on a computer causes the computer to perform the steps of:

generating a training matrix from a set of execution traces that characterize a process, with rows of the training matrix representing individual execution traces and columns of the training matrix representing attributes of the execution traces;

learning a predictive model from the training matrix by forming a binary decision tree, wherein the predictive model determines a likelihood of a given instance reaching a specified outcome, such that attributes that are more relevant to predicting the specified outcome are placed closer to a root node of the binary decision tree than less relevant attributes;

identifying attributes in the predictive model that fall below a threshold measure of relevance to the specified outcome using a processor;

automatically removing the identified attributes from the set of execution traces by setting to zero any entry in the training matrix that corresponds to an attribute that falls below the threshold measure of relevance;

mining the pruned process model from the training matrix after removing the identified attributes;

characterizing care pathways leading to hospitalization based on the pruned process model for health care determinations; and predicting that a patient will be hospitalized based on the characterized care pathways, such that only care pathways of relevant attributes are used to determine whether to hospitalize the patient.

7. An execution log pruning system, comprising:
a hardware processor;
a memory, coupled to the hardware processor, that stores a computer program product, the computer program product comprising:
a predictive model module, implemented by the hardware processor, configured to generate a training matrix from a set of execution traces that characterize a process, with rows of the training matrix representing individual execution traces and columns of the training matrix representing attributes of the execution traces, to learn a predictive model from the training matrix by forming a binary decision tree, wherein the predictive model determines a likelihood of a given instance reaching a specified outcome, such that attributes that are more relevant to predicting the specified outcome are placed closer to a root node of the binary decision tree than less relevant attributes;
a relevance module, implemented by the hardware processor, configured to identify attributes in the predictive model that fall below a threshold measure of relevance to the specified outcome; and
a pruning module, implemented by the hardware processor, configured to automatically remove the identified attributes from the set of execution traces by setting to zero any entry in the training matrix that corresponds to an attribute that falls below the threshold measure of relevance, to mine a pruned process model from the training matrix after the identified attributes are removed, to characterize care pathways leading to hospitalization based on the pruned process model for health care determinations, and to predict that a patient will be hospitalized based on the characterized care pathways, such that only care pathways of relevant attributes are used to determine whether to hospitalize the patient.

8. The system of claim 7, wherein the threshold measure of relevance is a rank in the binary decision tree, such that attributes that are farther away from the root node than the threshold rank are identified in said step of identifying.

9. The system of claim 7, wherein each execution trace comprises one or more attributes that represent individual tasks or data values in the execution trace.

10. The system of claim 7, wherein the training matrix is binary-valued, and the predictive model is further configured to set a value of one for any attribute of the training matrix that is present in an execution trace, and to set a value of zero for any attribute that is absent in the execution trace.

* * * * *